(12) United States Patent
Wu et al.

(10) Patent No.: US 11,265,828 B2
(45) Date of Patent: Mar. 1, 2022

(54) POWER ALLOCATION FOR SIDELINK FEEDBACK TRANSMISSION

(71) Applicant: QUALCOMM Incorporated, San Diego, CA (US)

(72) Inventors: Shuanshuan Wu, San Diego, CA (US); Kapil Gulati, Hillsborough, NJ (US); Sudhir Kumar Baghel, Hillsborough, NJ (US); Arthur Gubeskys, San Diego, CA (US); Gabi Sarkis, San Diego, CA (US); Tien Viet Nguyen, Bridgewater, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/991,676

(22) Filed: Aug. 12, 2020

(65) Prior Publication Data

US 2021/0058877 A1 Feb. 25, 2021

Related U.S. Application Data

(60) Provisional application No. 62/889,898, filed on Aug. 21, 2019.

(51) Int. Cl.
*H04W 52/18* (2009.01)
*H04W 52/38* (2009.01)
*H04W 52/34* (2009.01)

(52) U.S. Cl.
CPC ....... *H04W 52/383* (2013.01); *H04W 52/346* (2013.01)

(58) Field of Classification Search
CPC . H04W 52/346; H04W 52/383; H04W 52/18; H04L 1/0026

(Continued)

(56) References Cited

U.S. PATENT DOCUMENTS

| 5,960,361 A * | 9/1999 | Chen | H04W 52/367 |
| | | | 455/522 |
| 6,399,917 B1 * | 6/2002 | Simond | B23K 9/32 |
| | | | 15/93.1 |

(Continued)

OTHER PUBLICATIONS

CATT: "Sidelink Physical Layer Procedures in NR V2X," 3GPP Draft, 3GPP TSG RAN WG1 Meeting #98, R1-1908584, 3rd Generation Partnership Project (3GPP), Mobile Competence Centre, 650, Route Des Lucioles, F-06921, Sophia-Antipolis Cedex, France, vol. RAN WG1, No. Prague, CZ; Aug. 26, 2019-Aug. 30, 2019, Aug. 17, 2019 (Aug. 17, 2019), XP051765192, 9 pages, section 5.

(Continued)

*Primary Examiner* — Hai V Nguyen
(74) *Attorney, Agent, or Firm* — Danai Nelisile Mhembere; Patterson & Sheridan, LLP

(57) ABSTRACT

Certain aspects of the present disclosure provide techniques for power allocation for sidelink feedback transmission. A method that may be performed by a user equipment (UE) include receiving one or more data transmissions from one or more other UEs, generating a feedback signal for each of one or more data transmissions, determining a transmission power of the feedback signal for each of one or more data transmissions based on at least one configuration associated with the feedback signal, and transmitting the feedback signal to each of the one or more other UEs using the determined transmission power.

28 Claims, 7 Drawing Sheets

US 11,265,828 B2
Page 2

(58) Field of Classification Search
USPC .................................................. 455/522, 69
See application file for complete search history.

(56) References Cited

U.S. PATENT DOCUMENTS

| | | | |
|---|---|---|---|
| 9,019,882 B2* | 4/2015 | Bergquist | H04W 76/28 370/311 |
| 9,297,859 B2* | 3/2016 | Mukaitani | H02J 7/007 |
| 9,462,520 B2* | 10/2016 | Siomina | H04W 36/0085 |
| 9,610,857 B2* | 4/2017 | Dai | B60L 53/12 |
| 9,726,763 B2* | 8/2017 | Dempsey | G01R 31/371 |
| 9,783,020 B2* | 10/2017 | Chuang | B60H 1/00564 |
| 9,895,995 B2* | 2/2018 | Dai | H01M 10/625 |
| 9,952,289 B2* | 4/2018 | Hanyu | H02J 7/007 |
| 9,954,260 B2* | 4/2018 | Ho | H01M 10/658 |
| 9,967,912 B2* | 5/2018 | Kazmi | H04W 48/16 |
| 10,091,824 B2* | 10/2018 | Kazmi | H04L 5/0085 |
| 10,144,304 B2* | 12/2018 | Dai | B60H 1/00392 |
| 10,151,802 B2* | 12/2018 | Riemer | H01M 10/488 |
| 10,173,687 B2* | 1/2019 | Sham | B60K 28/063 |
| 10,184,988 B2* | 1/2019 | Bourilkov | G01R 31/371 |
| 10,297,875 B2* | 5/2019 | Riemer | G01R 31/371 |
| 10,327,169 B2* | 6/2019 | Lee | H04W 4/46 |
| 10,367,677 B2* | 7/2019 | Parkvall | H04W 52/0251 |
| 10,483,634 B2* | 11/2019 | Bourilkov | H01Q 1/44 |
| 10,525,787 B2* | 1/2020 | Cheng | H01M 10/613 |
| 10,608,293 B2* | 3/2020 | Riemer | G01R 31/3835 |
| 10,630,410 B2* | 4/2020 | Parkvall | H04W 8/18 |
| 10,638,253 B1* | 4/2020 | Parkvall | H04L 5/1469 |
| 10,698,032 B2* | 6/2020 | Bourilkov | G01R 31/371 |
| 10,703,211 B2* | 7/2020 | Chuang | H02J 7/0018 |
| 10,744,845 B2* | 8/2020 | Chuang | H01M 10/6568 |
| 10,746,804 B2* | 8/2020 | Park | G01R 31/364 |
| 10,818,979 B2* | 10/2020 | Riemer | G01R 31/364 |
| 10,833,829 B2* | 11/2020 | Lee | H04L 5/0094 |
| 10,863,447 B2* | 12/2020 | Guo | H04L 1/1812 |
| 10,916,850 B2* | 2/2021 | Bourilkov | H02J 7/0047 |
| 10,938,497 B2* | 3/2021 | Parkvall | H04L 5/0053 |
| 10,964,980 B2* | 3/2021 | Chappelle | H02J 7/0036 |
| 10,971,769 B2* | 4/2021 | Riemer | G01R 31/382 |
| 10,986,622 B2* | 4/2021 | Zhang | H04B 7/088 |
| 11,024,891 B2* | 6/2021 | Riemer | H01M 10/48 |
| 11,024,892 B2* | 6/2021 | Riemer | G01R 31/3835 |
| 11,031,686 B2* | 6/2021 | Bourilkov | H01M 10/48 |
| 2013/0171955 A1 | 7/2013 | Makhlouf | H04W 52/242 455/404.1 |
| 2014/0071868 A1* | 3/2014 | Bergquist | H04W 76/28 370/311 |
| 2014/0080506 A1* | 3/2014 | Siomina | G01S 5/0036 455/456.1 |
| 2014/0206341 A1* | 7/2014 | Siomina | H04W 36/0088 455/422.1 |
| 2016/0056510 A1* | 2/2016 | Takeuchi | H01M 10/482 429/7 |
| 2017/0064571 A1* | 3/2017 | Kusashima | H04W 48/16 |
| 2017/0078863 A1* | 3/2017 | Kim | H04W 48/16 |
| 2017/0181032 A1* | 6/2017 | Kazmi | H04L 5/0098 |
| 2017/0331577 A1* | 11/2017 | Parkvall | H04W 4/00 |
| 2017/0331670 A1* | 11/2017 | Parkvall | H04J 11/0079 |
| 2018/0249429 A1* | 8/2018 | Zhang | H04W 52/383 |
| 2018/0294907 A1* | 10/2018 | Chen | H04B 1/00 |
| 2019/0090293 A1* | 3/2019 | Su | H04W 8/005 |
| 2019/0132104 A1* | 5/2019 | Lee | H04L 1/1607 |
| 2019/0312688 A1* | 10/2019 | Baldemair | H04L 5/0057 |
| 2020/0022089 A1* | 1/2020 | Guo | H04L 5/0048 |
| 2020/0067685 A1* | 2/2020 | Awad | H04L 5/0053 |
| 2020/0092685 A1* | 3/2020 | Fehrenbach | H04B 7/2606 |
| 2020/0120482 A1* | 4/2020 | Parkvall | H04W 4/00 |
| 2020/0228247 A1* | 7/2020 | Guo | H04L 1/1854 |
| 2020/0304272 A1* | 9/2020 | Lee | H04L 5/0064 |
| 2020/0314770 A1* | 10/2020 | Wu | H04W 52/242 |
| 2020/0314960 A1* | 10/2020 | Basu Mallick | H04W 72/1242 |
| 2020/0351833 A1* | 11/2020 | Chae | H04W 52/383 |
| 2020/0374960 A1* | 11/2020 | Deenoo | H04W 72/14 |
| 2020/0396685 A1* | 12/2020 | Nam | H04W 76/28 |
| 2020/0396747 A1* | 12/2020 | Lee | H04W 72/02 |
| 2020/0396760 A1* | 12/2020 | Yi | H04W 72/042 |
| 2020/0412508 A1* | 12/2020 | Wu | H04L 1/1861 |
| 2021/0006376 A1* | 1/2021 | Cirik | H04L 5/0094 |
| 2021/0006614 A1* | 1/2021 | Oyman | H04L 65/4084 |
| 2021/0007088 A1* | 1/2021 | Zhou | H04W 72/042 |
| 2021/0014823 A1* | 1/2021 | Takeda | H04L 5/0085 |
| 2021/0022082 A1* | 1/2021 | Baldemair | H04L 1/1896 |
| 2021/0022162 A1* | 1/2021 | Zhou | H04W 72/1289 |
| 2021/0041522 A1* | 2/2021 | Manolakos | H04B 7/0404 |
| 2021/0050978 A1* | 2/2021 | Manolakos | H04L 5/0048 |
| 2021/0058833 A1* | 2/2021 | Basu Mallick | H04W 76/23 |
| 2021/0067277 A1* | 3/2021 | Wu | H04W 24/08 |
| 2021/0075558 A1* | 3/2021 | Takeda | H04W 72/0446 |
| 2021/0092688 A1* | 3/2021 | Guo | H04B 17/327 |
| 2021/0092789 A1* | 3/2021 | Basu Mallick | H04W 76/18 |
| 2021/0111772 A1* | 4/2021 | Lee | H04B 7/216 |
| 2021/0126726 A1* | 4/2021 | Parkvall | H04J 11/0079 |
| 2021/0136781 A1* | 5/2021 | Hosseini | H04W 72/0413 |

OTHER PUBLICATIONS

International Search Report and Written Opinion—PCT/US2020/046205—ISA/EPO—dated Nov. 3, 2020.
LG Electronics: "Discussion on Physical Layer Procedures for NR Sidelink," 3GPP Draft, 3GPP TSG RAN WG1 Meeting #98, R1-1908906, Discussion on Physical Layer Procedures for NR Sidelink, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 17, 2019 (Aug. 17, 2019), XP051765514, 19 pages, section 2.2.2 section 2.1; p. 3-p. 4 section 2.2.1; p. 6-p. 7.
Mediatek Inc: "Physical Layer Procedures for Sidelink," 3GPP Draft, 3GPP TSG RAN WG1 #98, R1-1908401, V2X Physical Layer Procedure Final, 3rd Generation Partnership Project (3GPP), Mobile Competence Centre, 650, Route Des Lucioles, F-06921, Sophia-Antipolis Cedex, France, vol. RAN WG1, No. Prague, CZ; Aug. 26, 2019-Aug. 30, 2019, Aug. 17, 2019 (Aug. 17, 2019), XP051765010, 16 pages, Section 2.1-2.3, Sections 3. 3.1.2. 3.1.4. 3.2.1, Section 4.

* cited by examiner

POWER ALLOCATION FOR SIDELINK FEEDBACK TRANSMISSION

CROSS-REFERENCE TO RELATED APPLICATION

This application claims benefit of and priority to U.S. Provisional Application No. 62/889,898, filed Aug. 21, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved feedback signaling.

Certain aspects provide a method for wireless communication by a user-equipment (UE). The method generally includes receiving a plurality of data transmissions from a plurality of other UEs, generating a feedback signal for each of a plurality of data transmissions, determining a transmission power of the feedback signal for each of the plurality of data transmissions based on at least one configuration associated with the feedback signal, wherein the feedback signals for the plurality of data transmissions are transmitted during the same feedback occasion, and transmitting the feedback signal to each of the plurality of other UEs using the determined transmission power.

Certain aspects provide an apparatus for wireless communication by a UE. The apparatus generally includes means for receiving a plurality of data transmissions from a plurality of other UEs, means for generating a feedback signal for each of the plurality of data transmissions, means for determining a transmission power of the feedback signal for each of the plurality of data transmissions based on at least one configuration associated with the feedback signal, wherein the feedback signals for the plurality of data transmissions are transmitted during the same feedback occasion, and means for transmitting the feedback signal to each of the plurality of other UEs using the determined transmission power.

Certain aspects provide an apparatus for wireless communication by a UE. The apparatus generally includes a receiver configured to receive a plurality of data transmissions from a plurality of other UEs, a processing system configured to generate a feedback signal for each of the plurality of data transmissions, and determine a transmission power of the feedback signal for each of the plurality of data transmissions based on at least one configuration associated with the feedback signal, wherein the feedback signals for the plurality of data transmissions are transmitted during the same feedback occasion, and a transmitter configured to transmit the feedback signal to each of the plurality of other UEs using the determined transmission power.

Certain aspects provide a computer-readable medium having instructions stored thereon to cause a UE to receive a plurality of data transmissions from a plurality of other UEs, generate a feedback signal for each of the plurality of data transmissions, determine a transmission power of the feedback signal for each of the plurality of data transmissions based on at least one configuration associated with the feedback signal, wherein the feedback signals for the plurality of data transmissions are transmitted during the same feedback occasion, and transmit the feedback signal to each of the plurality of other UEs using the determined transmission power.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
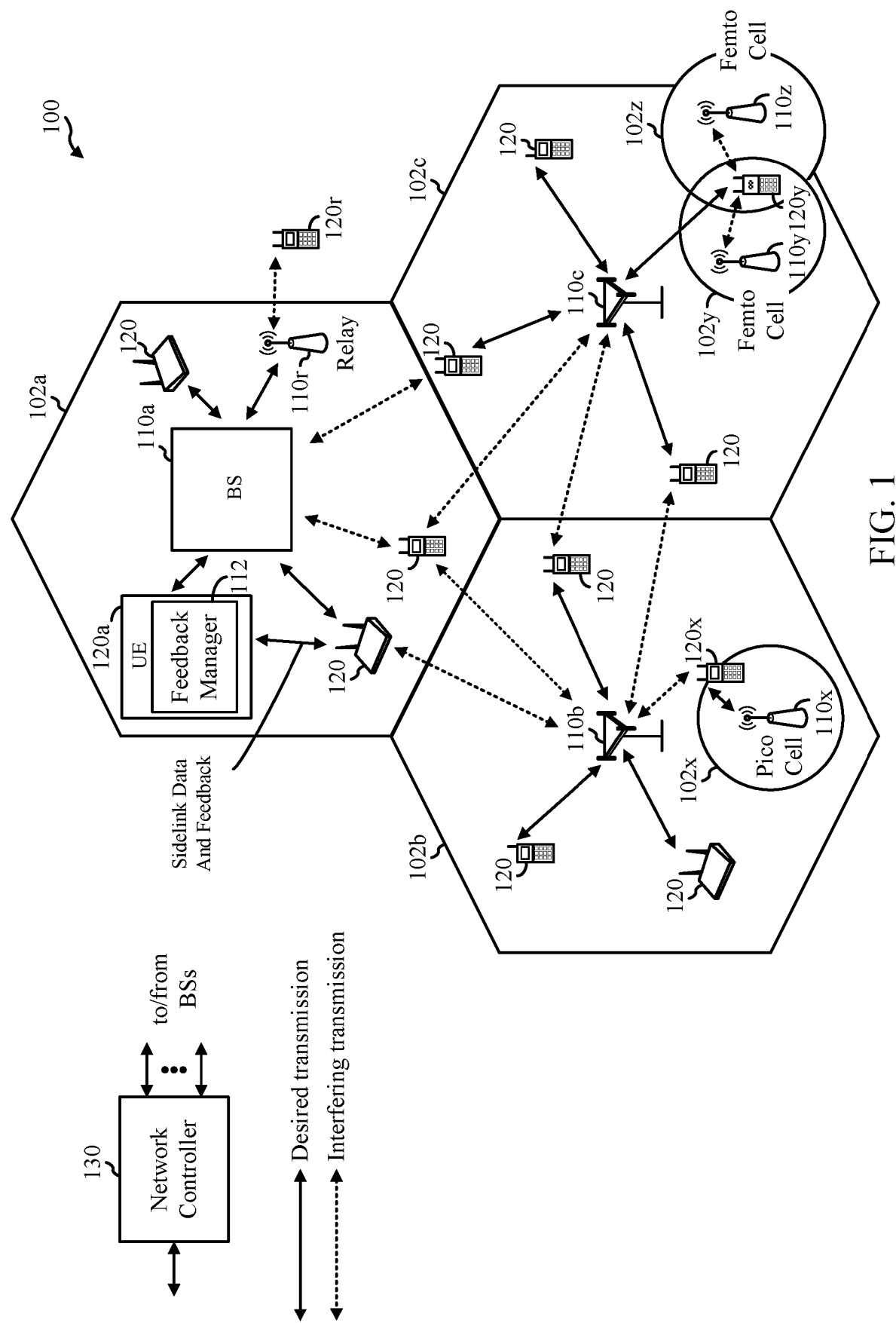
FIG. 1 is a block diagram conceptually illustrating an example telecommunications system, in accordance with certain aspects of the present disclosure.

Aspects of the present disclosure provide apparatus, methods, processing systems, and computer readable mediums for feedback signaling using a sidelink between one user-equipment (UE) and one or more other UEs. For example, certain aspects provide techniques for determining a transmission power of a feedback signal in accordance with various factors, as described in more detail herein.

The various factors may include one or any combination of a distance between UEs, reference signal reception power (RSRP), traffic priority, a transmission mode (e.g., unicast or groupcast), whether the feedback signal is an acknowledgement (ACK) or a negative acknowledgement (NACK), and an indication received from another node (e.g., network node or another UE). The UE may transmit multiple feedback signals to multiple UEs during the same feedback occasion, and the feedback signals may have different transmit powers depending on the specific factors applied in determining the feedback transmission powers.

The aspects described herein provide allow for a greater amount of power to be allocated to more important feedback signals. In other words, a NACK may be more important than ACK and thus may be allocated more power, or the feedback signal may be for a relatively high priority data transmission. Moreover, greater power may be allocated to feedback signals that may experience a greater amount path loss (e.g., due to the distance between the UEs).

The following description provides examples of feedback signaling in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for determining transmission power for feedback signaling. As shown in FIG. 1, the UE 120a includes a feedback manager 112. The feedback manager 112 may be configured to receive one or more data transmissions from one or more other UEs, generate a feedback signal for each of one or more data transmissions, determine a transmission power of the feedback signal for each of one or more data transmissions based on at least one configuration associated with the feedback signal, and transmit the feedback signal to each of the one or more other UEs using the determined transmission power. In some examples, the at least one configuration associated with the feedback signal may include one or any combination of a distance between the UE and the one or more other UEs, an RSRP parameter of a reference signal transmitted by the one or more other UEs, a priority associated with each data transmission of the one or more data transmissions, a transmission mode associated with each data transmission of the one or more data transmissions, whether the feedback signal is an acknowledgement of the data transmission or a negative acknowledgement of the data transmission, and an indication received from each of the one or more other UEs or a network node.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
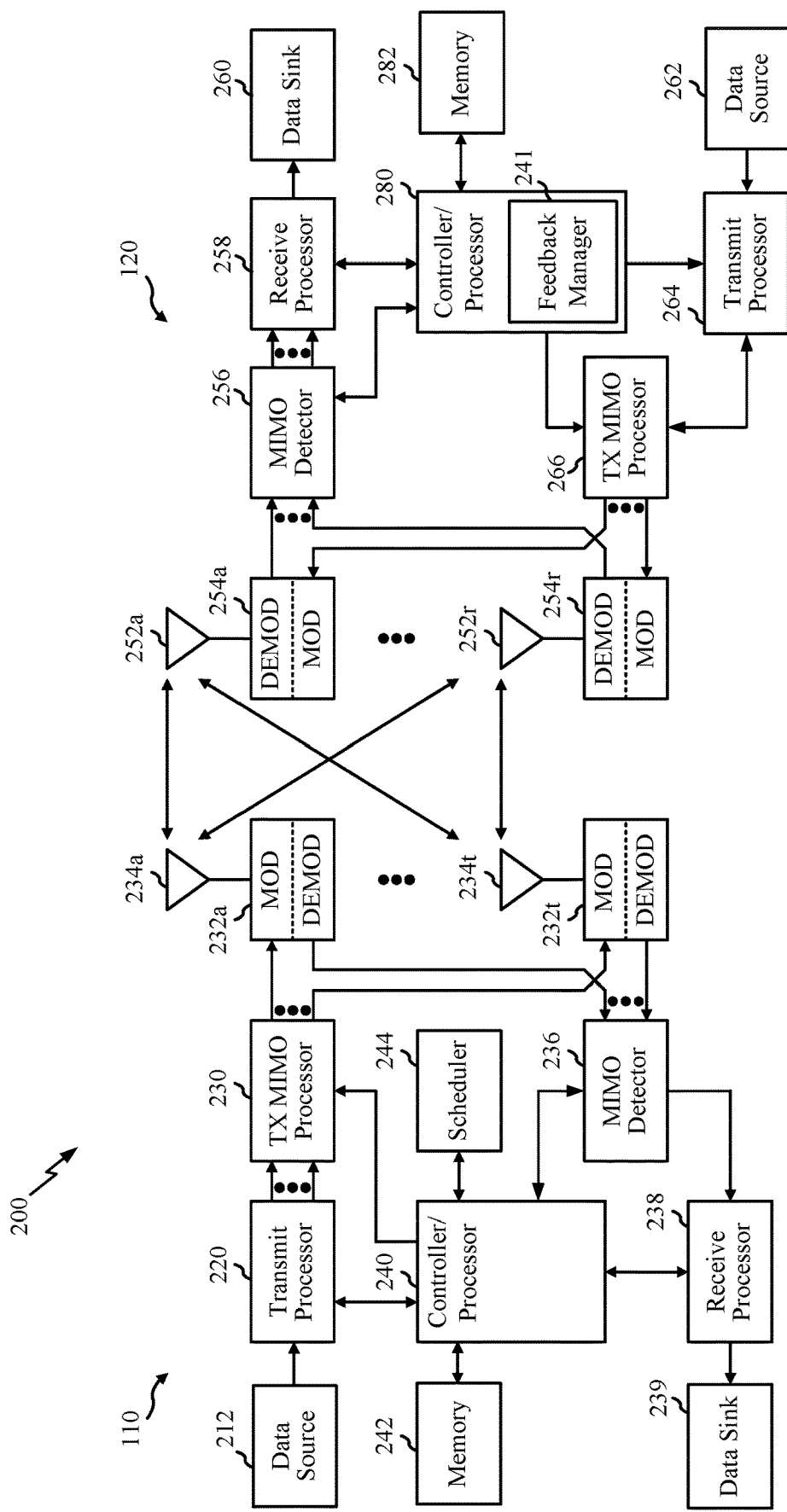
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has a feedback manager 241 that may be configured for determining a transmission power of feedback signaling, according to aspects described herein. Although shown at the Controller/Processor, other components of the UE 120a may be used performing the operations described herein.

Figure 4:
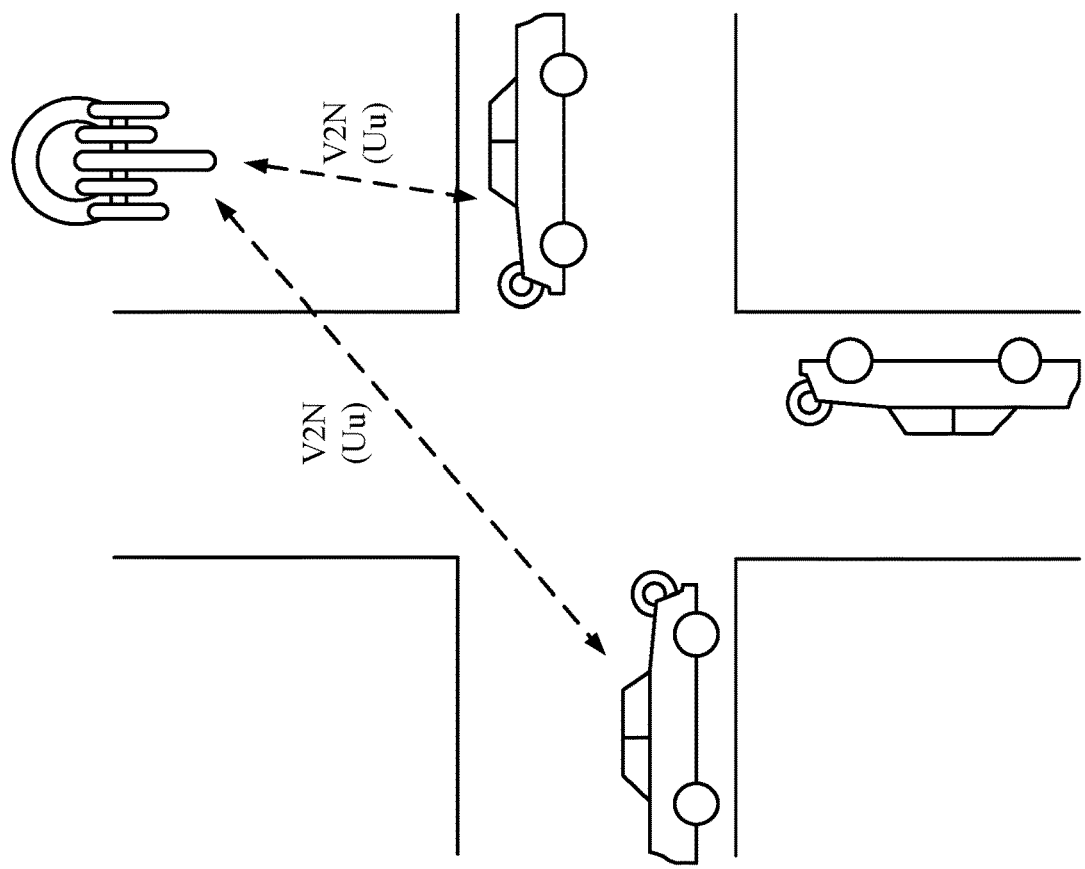
FIGS. 3 and 4 illustrate vehicle to everything (V2X) systems, in accordance with certain aspects of the present disclosure.
Figure 3:
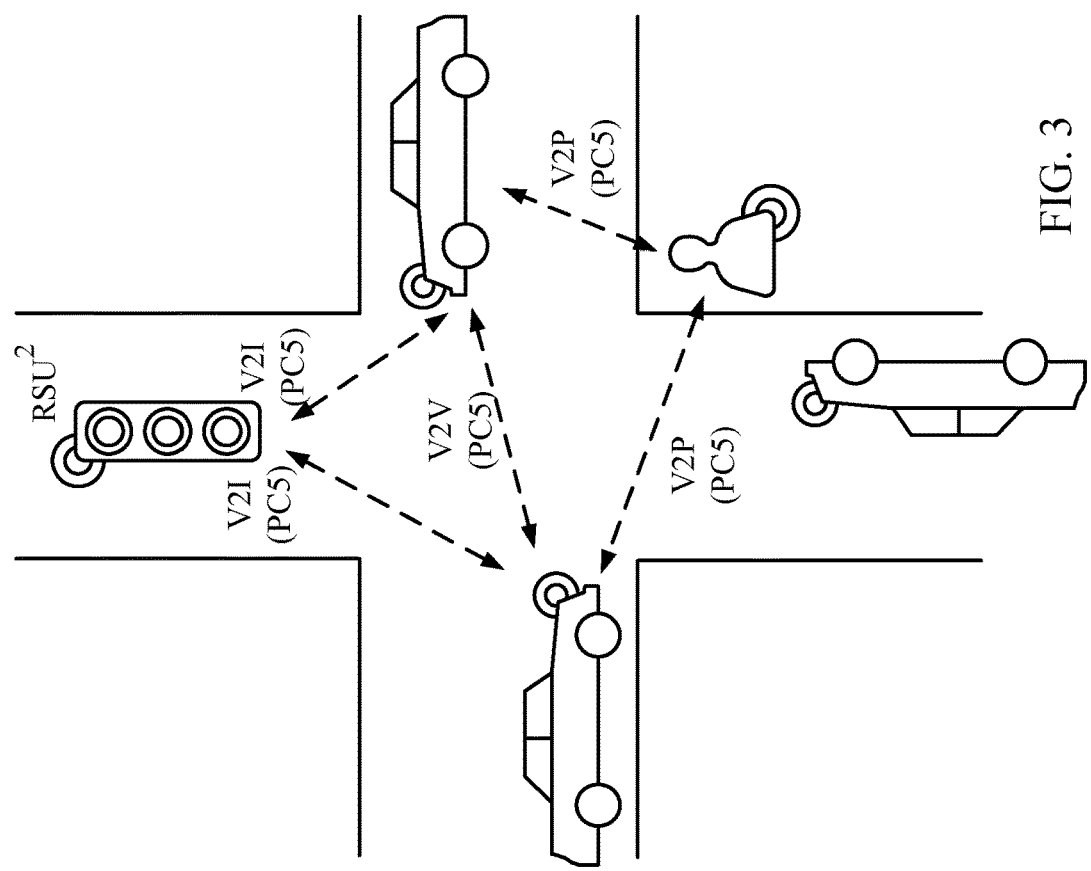
Figure 5:
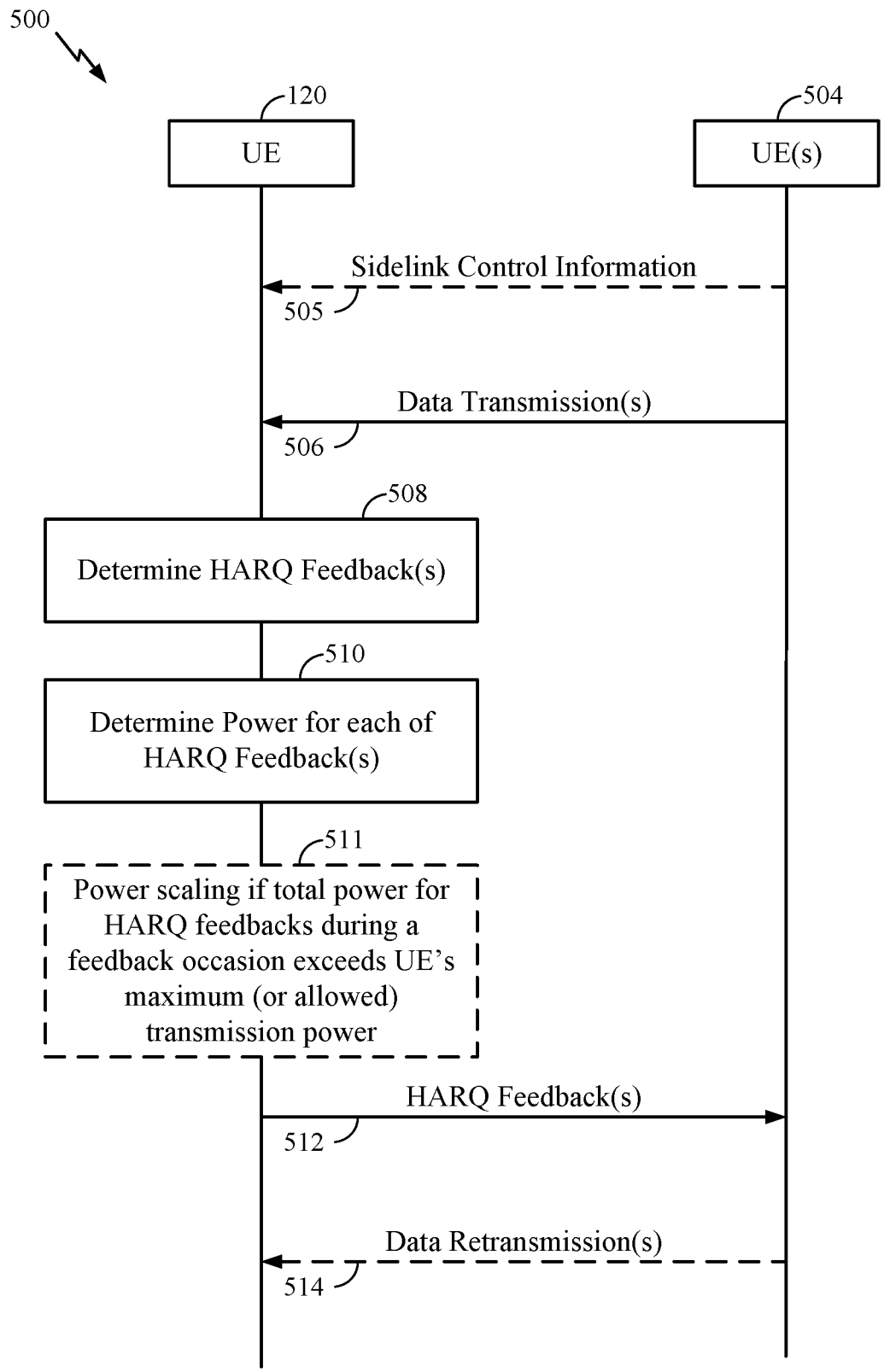
FIG. 5 is a call flow diagram illustrating example data and HARQ signaling, in accordance with aspects of the present disclosure

FIGS. 3 and 4 illustrate vehicle to everything (V2X) systems, in accordance with certain aspects of the present disclosure. Referring to FIG. 4, a V2X system is illustrated with two vehicles. The V2X system, provided in FIGS. 4 and 5 provides two complementary transmission modes. A first transmission mode involves direct communications (e.g., also referred to as side link communications) between participants in the local area. Such communications are illustrated in FIG. 4. A second transmission mode involves network communications through a network as illustrated in FIG. 4, which may be implemented over a "Uu interface".

Referring to FIG. 4, the first transmission mode allows for direct communication between different participants in a given geographic location. As illustrated, a vehicle can have a communication with an individual (V2P) through a PC5 interface. Communications between a vehicle and another vehicle (V2V) may also occur through a PC5 interface. In a like manner, communication may occur from a vehicle to other highway components, such as a signal (V2I) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles. Resource assignments do not need coordination between operators and subscription to a network is not necessary, therefore there is reduced complexity for such self-managed systems.

The V2X system is configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may be operated over a wider frequency band of 70 MHz to support advanced safety services in addition to basic safety services described above.

Referring to FIG. 4, a second of two complementary transmission modes is illustrated. In the illustrated embodiment, a vehicle may communicate to another vehicle through network communications. These network communications may occur through discrete nodes, such as eNodeB, that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

In either of the two complementary transmission modes, higher layers may be leveraged to tune congestion control parameters. In high density vehicle deployment areas, using higher layers for such functions provides an enhanced performance on lower layers due to congestion control for PHY/MAC.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

In the instance of a blind curve scenario, road conditions may play an integral part in decision making opportunities for vehicles. V2X communications can provide for significant safety of operators where stopping distance estimations may be performed on a vehicle by vehicle basis. These stopping distance estimations allow for traffic to flow around courses, such as a blind curve, with greater vehicle safety, while maximizing the travel speed and efficiency.

Example Techniques for Power Allocation for Sidelink Feedback Transmission

Certain aspects of the present disclosure are directed to techniques for sidelink communication. Sidelink communication generally refers to communication between multiple UEs, such as device-to-device (D2D) or vehicle-to-vehicle (V2V) communications, as described with respect to FIG. 4. In sidelink communications, hybrid automatic request (HARQ) feedback may be used to improve performance. That is, a UE may send HARQ acknowledgement (ACK)/negative acknowledgement (NACK) feedback to another UE. For instance, UE1 may send data to UE2, and UE2 may send an ACK or NACK to indicate whether the data is successfully decoded by UE2. Unlike a cellular link (Uu), however, sidelink feedback may be sent from one UE to multiple UEs with which the UE is in communication.

When a UE decodes data from multiple transmitting UEs, the UE may have multiple feedbacks to send in one feedback occasion (e.g., in a frequency division multiplexed (FDM) manner). However, these one-to-many links may differ from each other in terms of various link configurations such as link distance and reference signal receive power (RSRP) since some UEs may be closer to one another than others. Moreover, the traffic being communicated may have different priorities. In other words, different transmissions may have different priorities depending on the type of data being communicated. The transmission modes (unicast vs. groupcast) may also be different.

Certain aspects of the present disclosure are directed to determining the power to be allocated to sidelink feedback transmissions depending on specific configurations of each corresponding link. For example, a UE may send one or multiple HARQ ACK/NACK (A/N) feedbacks to one or multiple UEs in one HARQ feedback occasion. The transmission of the one or multiple A/N feedback is to acknowledge the decoding of one or multiple data channels which may be sent by one or multiple sidelink data transmitters.

In certain aspects, the UE determines the power for each A/N feedback transmission (e.g., determines the energy per resource element (EPRE)) based on one or multiple of the following factors. For example, the power may be determined based on a distance to the corresponding data transmitter, RSRP measured based on at least one reference signal (RS) from the data transmitter, traffic priority of the corresponding data, transmission mode of the corresponding data, feedback information of the corresponding data (e.g., whether the feedback is ACK or NACK), and/or indication from another node (e.g., the network node when BS schedules the sidelink transmission). As an example, the power of feedback to a remote (closer) UE may be boosted (reduced), the power of feedback to a higher (lower) priority traffic may be boosted (reduced), and/or power of feedback that is groupcast may be reduced as compared to unicast, as described in more detail herein.

The aspects described herein allow for a greater amount of power to be allocated to more important feedback signals. In other words, a NACK may be more important than ACK and thus may be allocated more power, or the feedback signal may be for a high priority data transmission, and thus, may be allocated relatively more power. Moreover, greater power may be allocated to feedback signals that may experience a greater amount of path loss (e.g., due to the distance between the UEs). Allocating a greater amount of power to certain feedback signals may compensate for the limited processing gain of A/N feedback signaling as only 1 or 2 RBs bandwidth may allocated for feedback in some implementations.

FIG. 5 is a call flow diagram 500 illustrating example data and feedback signaling, in accordance with aspects of the present disclosure. As illustrated, a receiver UE 120 may receive control signaling 505 (e.g., sidelink control information (SCI), also referred to herein as a sidelink control signal) that schedules resources for reception of data 506 to be received from one or more transmitter UEs 504 (also referred to as data transmitter(s)). In some cases, the data 506 may be scheduled by a network node (e.g., BS 110).

The UE 120 then determines, at block 508, HARQ feedback(s) to transmit to one or multiple of the transmitter UEs 504. The UE 120 may also determine, at block 510, the power for each of the HARQ feedback(s) based on one or more considerations, as described in more detail herein. For example, the power for the HARQ feedback(s) may be determined based on a distance to the corresponding data transmitter (e.g., the one or more transmitter UE(s) 504), a RSRP measured based on an RS from the data transmitter(s), traffic priority of the corresponding data, transmission mode of the corresponding data, the determined HARQ feedback (e.g., whether the HARQ feedback is ACK or NACK), an indication from a network node (when BS 110 schedules the sidelink transmission) or from the data transmitter UE. For example, an indication may be received by UE 120 that indicates the power allocation for a corresponding NACK.

Optionally, the UE 120 may perform power scaling, at block 511, if the total transmission power for the HARQ feedbacks during the feedback occasion exceeds the UE's maximum (or allowed) transmission power, as described in more detail herein. The UE 120 then applies the determined power and transmits the HARQ feedback(s) 512. Depending on the HARQ feedback(s) 512, there may be one or more data retransmissions 514 (e.g., retransmissions of data transmissions 506), as illustrated.

Figure 6:
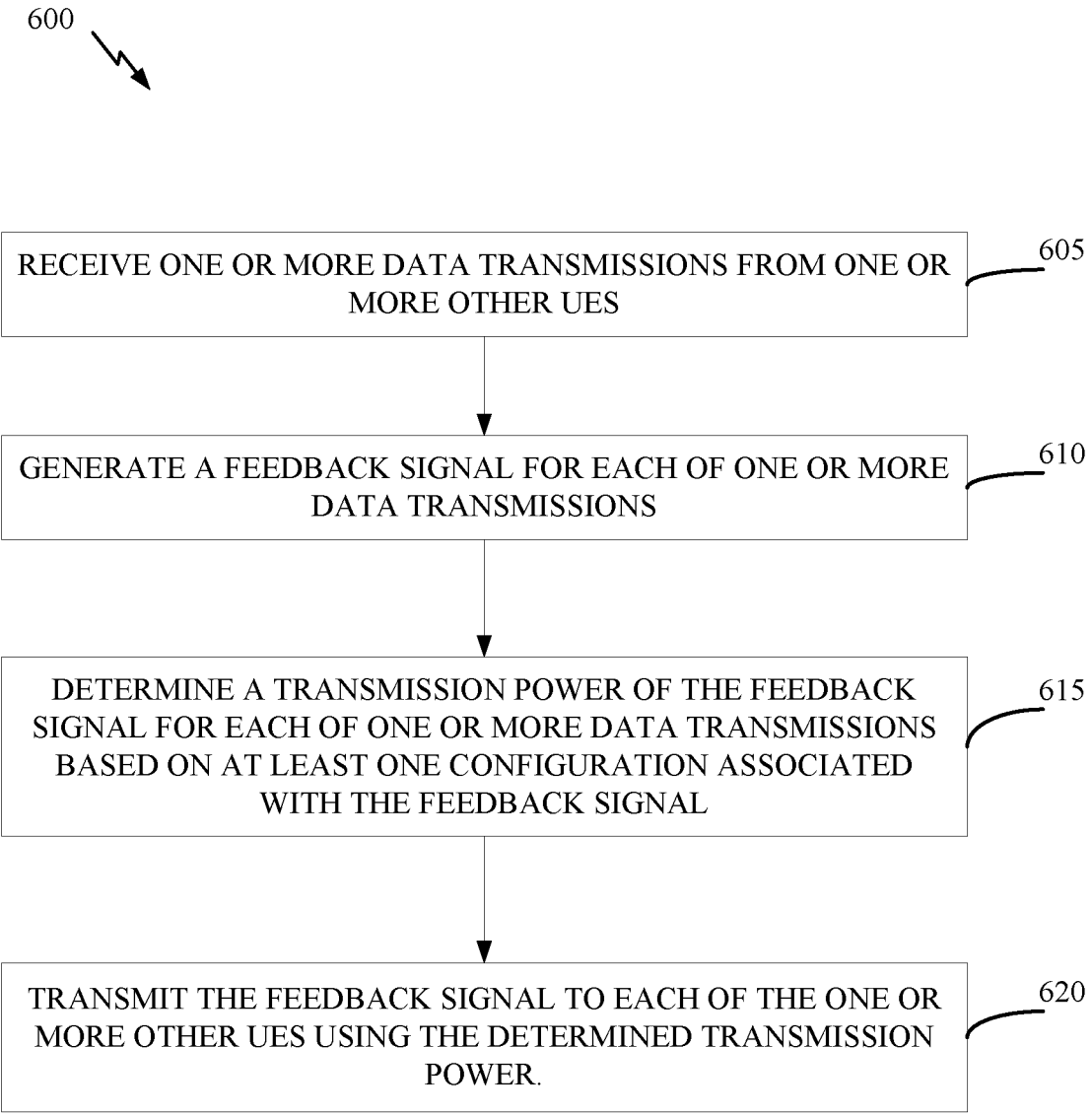
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., such as UE 120a in the wireless communication network 100).

Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, by the UE receiving one or more data transmissions from one or more other UEs, and at block 610, generating a feedback signal (e.g., HARQ feedback signal) for each of one or more data transmissions. In other words, the UE may determine the feedback(s) to transmit. In some aspects, the one or more data transmissions may be a plurality of data transmissions from a plurality of other UEs. The determination of the feedback(s) may include determining whether a received data channel needs a feedback, as well as whether the feedback is an ACK or NACK. For example, when a received data channel corresponds to an ACK/NACK feedback mode, a feedback may be sent if control information (e.g., sidelink control information (SCI)) associated with the data channel is successfully decoded, in which case, the feedback is either an ACK or a NACK, depending on the decoding of the data. That is, if the decoding of the data is successful, the feedback is an ACK, and otherwise the feedback is a NACK. When a received data channel corresponds to a NACK-only feedback mode, a feedback is sent if the control information is decoded, but the decoding of the data fails, in which case the feedback is a NACK. Whether feedback is to be transmitted may also depend on the distance and/or RSRP from the data transmitter to the receiver UE. A feedback may be desired only if the distance between the data transmitter and receiver UE is smaller than a distance threshold, and/or, the RSRP measured at the receiver UE is greater than a RSRP threshold.

Figure 7:
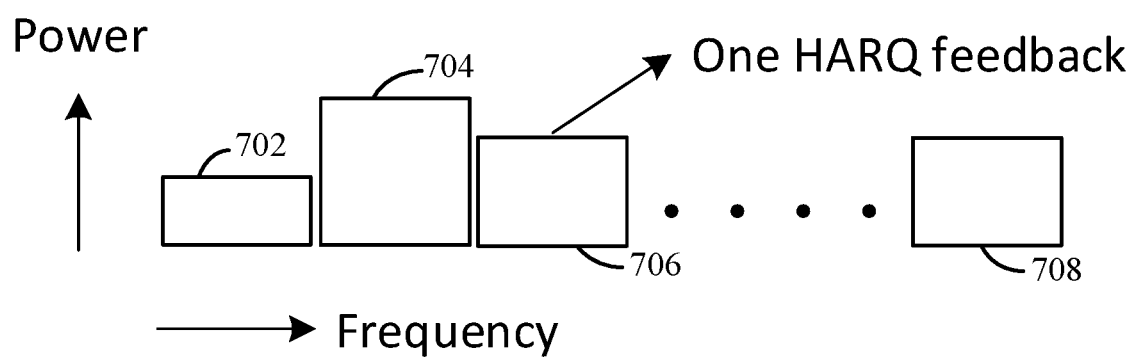
FIG. 7 illustrates frequency division multiplexed feedback signaling, in accordance with certain aspects of the present disclosure.

The UE then, at block 615, determines a transmission power of the feedback signal for each of one or more data transmissions based on at least one configuration associated with the feedback signal. For example, the determination of the transmission powers of the feedback signals may be made for each feedback signal based on a respective configuration associated with the feedback. In other words, the transmission powers of the feedback signals may be different. In certain aspects, the one or more data transmissions include a plurality of data transmissions, and the feedback signals for the plurality of data transmissions may be transmitted during the same feedback occasion (e.g., via the same sidelink feedback channel). The feedback signals may be frequency division multiplexed during the feedback occasion. For example, as illustrated in FIG. 7, feedback signals 702, 704, 706, 708 are frequency divisional multiplexed and have different transmission powers.

In certain aspects, the determination of the transmission power may include determining at least one energy per resource element (EPRE) parameter for the transmission of the feedback signal to each of the one or more other UEs, as described in more detail herein. The determination of the transmission power may include determining a power ratio, where the power ratio indicates ratio between the transmission power and a reference transmission power. The reference transmission power may be configured by a network node, preconfigured at the UE, or determined by the UE. For instance, the UE may determine the reference transmission power based on at least one of a bandwidth for transmission of the feedback signal for each of the one or more data transmissions, a quantity of the feedback signals to be transmitted to the one or more other UEs, or a transmission power capability of the UE, or any combination thereof. Returning to FIG. 6, at block 620, the UE transmits the feedback signal to each of the one or more other UEs using the determined transmission power.

In certain aspects, the at least one configuration associated with the feedback signal used at block 615 to determine the transmission power may include a distance between the UE and the one or more other UEs. For example, the UE 120 may determine a distance between the UE 120 and the data transmitter. The data transmitter may indicate its location (e.g., by a zone index) in sidelink control information and/or as part of the data transmission. The UE 120 may then determine the distance based on the location of the data transmitter and the UE 120.

In certain aspects, the UE determines feedback power based at least on the distance such that a larger distance results in higher feedback transmission power. For example, the feedback channel may have a reference EPRE value (e.g., reference transmission power). This reference EPRE value may be predefined or configured (e.g., by BS 110), or derived from the UE's transmission power, channel bandwidth and/or number of A/N feedbacks the UE 120 is to send. A pre-defined mapping rule may map a distance to an EPRE ratio. The EPRE ratio may be a ratio of the EPRE (e.g., transmission power) of a feedback to the reference EPRE. The mapping rule may be defined such that a larger distance corresponds to a larger value for the EPRE ratio, meaning a larger distance results in a higher feedback transmission power. In some cases, there may be a range for the value of the EPRE ratio. In other words, the EPRE ratio may range between a maximum EPRE ratio and a minimum of EPRE ratio. In certain aspects, when the distance between the UEs is less than a first threshold, EPRE ratio may be set to the minimum of the EPRE ratio range, and when the distance is greater than a second threshold (e.g., a second distance threshold that is greater than the first threshold), the EPRE ratio may be set to the maximum of the EPRE ratio range.

In certain aspects, the at least one configuration associated with the feedback signal used at block 615 to determine the transmission power may include a RSRP of a reference signal transmitted by each of the one or more other UEs. For example, the UE 120 may measure the received power of the reference signal(s) in a sidelink control channel. The UE 120 then determines the feedback power based at least on the RSRP such that a larger RSRP may result in a lower feedback transmission power. As an example, the feedback channel may have a reference EPRE value, as described herein. A pre-defined mapping rule may map a RSRP to an EPRE ratio (e.g., ratio of EPRE of a feedback to the reference EPRE). The mapping rule may be defined such that a larger RSRP value (e.g., implying a smaller distance) corresponds to a smaller value for the EPRE ratio, meaning a smaller distance may result in a smaller feedback transmission power. The EPRE ratio may have a range between a maximum EPRE ratio and a minimum EPRE ratio, as described herein.

In certain aspects, the at least one configuration associated with the feedback signal used at block 615 to determine the transmission power may include a priority associated with each of the one or more data transmissions. For example, the UE may determine the priority of the data. Some data traffic may have a higher priority than others. For example, the priority may be indicated in SCI. The UE may determine the feedback power based at least on the priority such that a higher priority may result in a higher feedback transmission power. As an example, the UE 120 may determine a reference EPRE, as described herein. A pre-defined mapping rule may map a priority to an EPRE ratio. The mapping rule may be defined such that a higher priority corresponds to a larger EPRE ratio. For example, traffic priorities on sidelink may be classified to high, medium, or low. Each of the three priority levels (high, medium, and low) may have a corresponding EPRE ratio 3 dB, 0 dB, and −3 dB, respectively. For example, the EPRE of a feedback for a data traffic with medium priority may be the same as the reference EPRE, while the power of feedback for high and low data traffic may be boosted and reduced by 3 dB, respectively.

In certain aspects, the operations 600 may also include determining a transmission mode (e.g., unicast, groupcast, multicast, or broadcast) associated with each data transmission of the one or more data transmissions. In this case, the at least one configuration associated with the feedback signal used at block 615 to determine the transmission power may include the transmission mode. The determination of the transmission power may be based on a mapping of the transmission mode to the transmission power such that a higher transmission power is used if the transmission mode is unicast as compared to the transmission mode being another transmission mode (e.g., groupcast). In other words, the UE 120 may determine the transmission mode of the data, which may be either unicast, groupcast, multicast, or broadcast. The transmission mode may be indicated or implied by one or more parameters in SCI. The UE may determine the feedback power based at least on the transmission mode such that at least one of the transmission modes is mapped to a higher (or lower) feedback transmission power than others. As an example, a pre-defined mapping rule may map a transmission mode to the EPRE ratio, as described herein. Specifically, unicast traffic may be mapped to a higher feedback power (e.g., higher EPRE ratio) since only a single UE is sending feedback as compared to groupcast where multiple UEs may be sending feedback. Therefore, a higher feedback power may be used for unicast transmission as compared to groupcast transmission. In other words, the data transmitter may receive the same feedback signal (e.g., sequence) using the same resources from multiple UEs, and as a result, each of the UEs can transmit the feedback signal at a lower transmission power since the powers of the feedbacks signals from the various UEs may be combined at the data transmitter.

In certain aspects, the at least one configuration associated with the feedback signal used at block 615 to determine the transmission power may include the information indicated by the feedback signal (e.g., whether the feedback signal is an acknowledgement of the data transmission or a negative acknowledgement of the data transmission). For instance, a higher transmission power may be used if the feedback signal is a negative acknowledgement as compared to the feedback signal being an acknowledgement. For example, the UE 120 may determine feedback power based at least on the HARQ feedback such that one feedback type may result in higher (or lower) feedback transmission power than another. As an example, a pre-defined mapping rule may map a feedback type to an EPRE ratio. A NACK feedback may be mapped to a higher feedback power (e.g., higher EPRE ratio). For instance, the EPRE ratio may be 0 dB for ACK feedback, while the EPRE ratio may be greater than 0 dB for NACK feedback. The feedback power associated with whether the feedback is ACK or NACK may be predefined or configured. In other words, NACK may be mapped to a higher feedback power because NACK is more important than ACK since the data transmitter may re-transmit the corresponding data when a NACK is detected. Thus, it may be more desirable to allocate more power to a NACK feedback as compared to an ACK feedback.

In certain aspects, the at least one configuration associated with the feedback signal used at block 615 to determine the transmission power may include an indication received from each of the one or more other UEs or a network node. For example, in certain aspects, the data transmitter may indicate the power allocation for the feedback transmission (e.g., using SCI). In other aspects, a network node (e.g., BS 110) may indicate the power allocation for feedback transmission (e.g., when BS 110 schedules the sidelink transmissions). For instance, a reference EPRE may be determined, as described herein, and the indication from the network node or data transmitter may be an indication of a ratio of the feedback EPRE to the reference EPRE. A positive value of the EPRE ratio (in dB) may be indicated when the feedback power is desired to be boosted with respect to the reference EPRE, and a negative value of EPRE ratio (in dB) may be indicated when the feedback power is desired to be reduced with respect to the reference EPRE.

One or more of the various factors described herein used for determining the transmission power of the feedback signaling may be used in combination. For instance, the transmission power of the feedback signaling may be determined based on a distance between the UE 120 and the data transmitter, as well as the priority of the data traffic. A pre-defined rule may map the distance and traffic priority to the feedback transmission power. The mapping rule may be defined such that for one priority category, a larger distance results in higher feedback power, or for the same distance, a higher priority category results in a higher feedback power.

As another example, the transmission power of the feedback signaling may be determined based on RSRP and transmission mode. For instance, a pre-defined rule may map the measured RSRP and transmission mode to the feedback transmission power. The mapping rule may be defined such that for the same RSRP value, one transmission mode may result in a relatively higher feedback power than others, or for the same transmission mode, a relatively higher RSRP may result in a lower feedback power.

As another example, the transmission power of the feedback signaling may be determined based on distance, priority, and feedback information. For instance, there may be separate rules mapping each of the factors (distance, priority, feedback information) to an EPRE ratio. For example, a pre-defined rule may map distance to EPRE ratio $p_{EPRE}^{(1)}$ (in dB), another pre-defined rule may map priority to EPRE ratio $p_{EPRE}^{(2)}$ (in dB), and yet another pre-defined rule may map feedback information to EPRE ratio $p_{EPRE}^{(3)}$ (in dB). The UE may also determine a reference EPRE $p_{EPRE}^{ref}$ (in dB), as described herein. Therefore, the EPRE ($p_{EPRE}$) for REs in a feedback may be equal to $p_{EPRE} = p_{EPRE}^{ref} + p_{EPRE}^{(1)} + p_{EPRE}^{(2)} + p_{EPRE}^{(3)}$ (in dB). The following provides one example set of values for the various EPRE ratios and reference EPRE to facilitate understating: $p_{EPRE}^{ref} = 0$ db, $p_{EPRE}^{(1)} = \{-3, -2, -1, 0, 1, 2, 3\}$ dB selected in accordance with distance mapping rule such that a larger distance results in a higher $p_{EPRE}^{(1)}$ value, $p_{EPRE}^{(2)} = \{-3, 0, 3\}$ dB selected in accordance with a priority mapping rule such that a higher priority results in a higher $p_{EPRE}^{(2)}$ value, $p_{EPRE}^{(2)} = \{0, 3\}$ dB determined based on feedback information mapping rule, and $p_{EPRE}^{(3)} = 0$ dB for ACK and 3 dB for NACK. While various combinations of the factors described herein have been provided to facilitate understanding, any combination of the various factors may be used to determine the transmission power of feedback signaling.

As described herein, the UE 120 may determine the transmission power for each feedback based on the reference EPRE and the determined EPRE ratio, and send the one or multiple feedback signals during a feedback occasion. For example, as described with respect to FIG. 7, multiple HARQ feedbacks may be FDMed. In certain aspects, each feedback transmission occupies a certain number of RBs or subcarriers.

In certain aspects, the HARQ feedbacks may be mapped to one or multiple symbols (e.g., orthogonal frequency division multiplexed (OFDM)) in a feedback occasion. For instance, the feedback signal described with respect to FIG. 6 may be transmitted, at block 620, via a plurality of symbols. In certain aspects, the transmission power determined based on the at least one configuration associated with the feedback signal may be applied to only a portion of the plurality of symbols. For example, when a feedback signal occupies multiple OFDM symbols, power allocation determined in accordance with the various factors described herein may be applied to every one of the OFDM symbols, or may be applied to some of the OFDM symbols. As an example, the first OFDM symbol of HARQ feedback may be transmitted as a reference power (e.g., $p_{EPRE}^{ref}$ and the transmission power (e.g., $p_{EPRE}$) determined based on the various factors described herein may be applied to the remaining OFDM symbols in the HARQ feedback channel.

As described with respect to FIG. 5, the UE 120 may optionally perform power scaling if a total power for the HARQ feedbacks during a feedback occasion exceeds the UE's maximum (or allowed) transmission power. For example, the one or more data transmissions, described with respect to FIG. 6, may include a plurality of data transmissions. In this case, the determination of the transmission powers of the feedback signals for the plurality of data transmissions may include calculating another transmission power for each of the feedback signals for the plurality of data transmissions based on the at least one configuration associated with the feedback signal, and determining whether a sum of the other transmission powers exceeds a maximum allowable transmission power associated with the transmission of the feedback signals during a feedback occasion. If the sum of the of the other transmission powers exceeds the maximum allowable transmission power, the UE may, optionally, scale down the other transmission powers until the sum of the other transmission powers are equal to or less than the maximum allowable transmission power to determine the transmission powers of the feedback signals. In other words, after power allocation, the total power should be determined to not exceed the UE's maximum (or allowed) transmission power. For example, some feedback signal(s) may be power boosted, while the power of other feedback signal(s) may be reduced. If the total boosted power is greater than total reduced power, the total power for the HARQ feedbacks may exceed the UE's maximum (or allowed) power. In this case, a scaling factor may be applied, which scales down the power for all or part of the feedback signals to ensure that the total power does not exceed the UE's maximum (or allowed) power.

As described herein, the reference EPRE may be determined by the UE using one or more of various suitable factors. As an example, the reference EPRE may be determined based on the UE's maximum (or allowed) transmission power and the total bandwidth for feedback transmission. For instance, the total bandwidth for feedback may accommodate 20 feedbacks, the reference transmission power (e.g., reference EPRE) for feedback being determined as the UE's maximum (or allowed) transmission power divided by 20. As another example, the reference EPRE may be determined by UE's maximum (or allowed) transmission power and the number of feedbacks to transmit. For instance, the total bandwidth for feedback may accommodate 20 feedbacks, but the UE may end up sending only 3 feedbacks. In this case, the reference EPRE may be determined assuming only 3 feedbacks (for instance, the reference transmission power for feedback may be determined as the UE's maximum (or allowed) transmission power divided by 3). As another example, the reference transmission power may be configured or predefined to be a value smaller than or equal to the UE's maximum (or allowed) transmission power.

Figure 8:
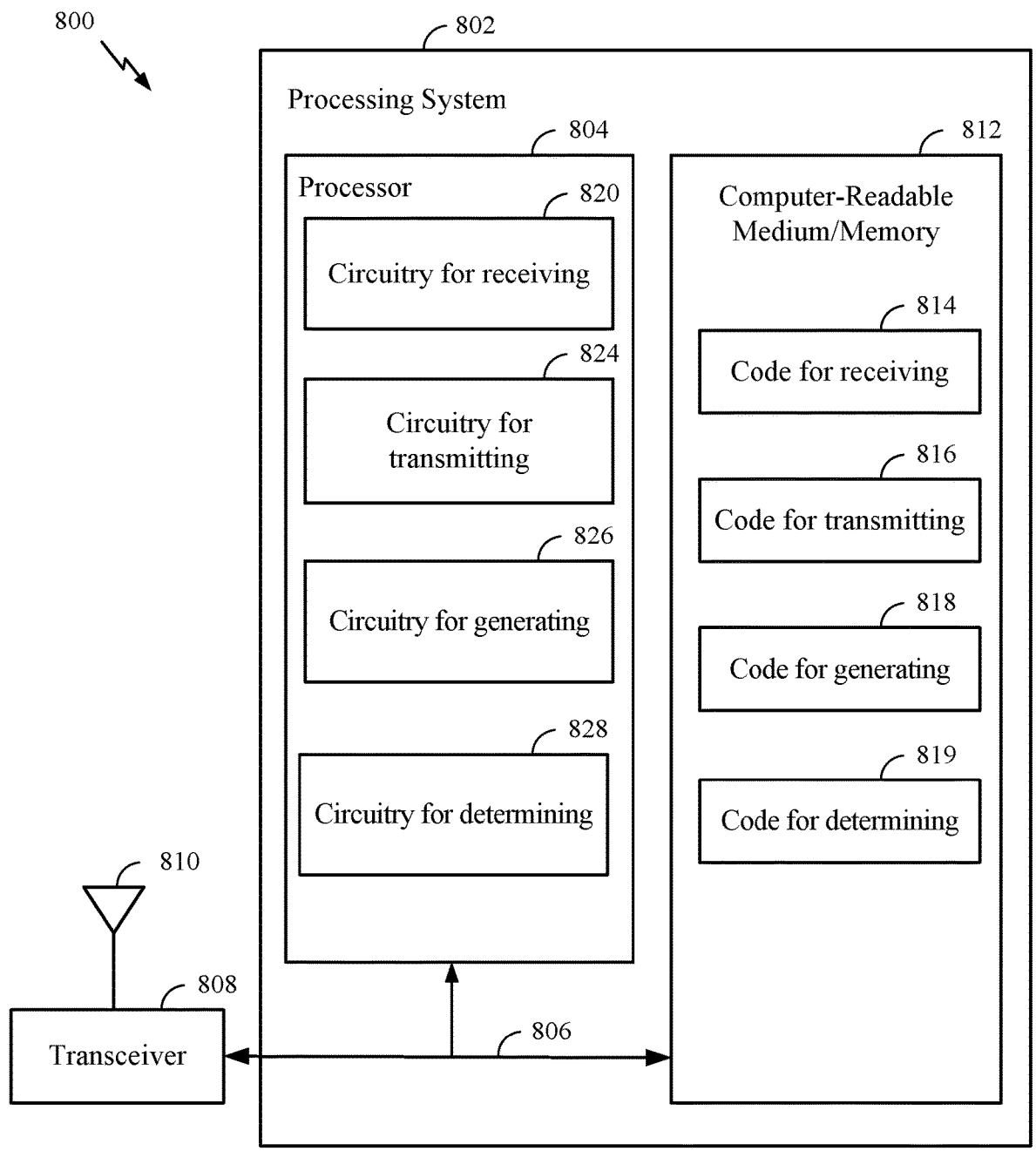
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for feedback signaling.

In certain aspects, computer-readable medium/memory 812 stores code 814 (e.g., an example of means for) for receiving; code 816 for (e.g., an example of means for) transmitting; code 818 for (e.g., an example of means for) generating; and code 819 for (e.g., an example of means for) determining. One or more of code 814, 816, 818, 818, 819 may be executed by a general-purpose processor, a digital signal processor (DSP), an application-specific integrated circuit (ASIC), a field programmable gate array (FPGA) or other programmable logic device. In certain aspects, the processor 804 executes the code stored in the computer-readable medium/memory 812. In certain aspects, computer-readable medium/memory 812 is an example of a feedback manager 112.

In certain aspects, alternatively or additionally, the processor 804 includes circuitry 820 for (e.g., an example of means for) receiving; circuitry 824 for (e.g., an example of means for) transmitting; circuitry 826 (e.g., an example of means for) for generating; and circuitry 828 for (e.g., an example of means for) determining. One or more of circuitry 820, 824, 826, 828 may be implemented by one or more of a general-purpose processor, a digital signal processor (DSP), an application-specific integrated circuit (ASIC), a field programmable gate array (FPGA) or other programmable logic device. In certain aspects, processor 804 is an example of a feedback manager 112.

The transceiver 808 may provide a means for receiving (e.g., means for receiving a plurality of data transmissions). The transceiver 808 may be an example of aspects of the transceiver 254 described with reference to FIG. 2. The antenna 810 may correspond to a single antenna or a set of antennas. The transceiver 808 may provide means for transmitting signals generated by other components of the device 800.

The feedback manager 112 may support wireless communication in accordance with examples as disclosed herein.

The feedback manager 112 may be an example of means for performing various aspects described herein. The feedback manager 112, or its sub-components, may be implemented in hardware (e.g., in uplink resource management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the feedback manager 112, or its sub-components, may be implemented in code (e.g., as uplink resource management software or firmware) executed by a processor, or any combination thereof. If implemented in code executed by a processor, the functions of the feedback manager 112, or its sub-components may be executed by a general-purpose processor, a digital signal processor (DSP), an application-specific integrated circuit (ASIC), a field programmable gate array (FPGA) or other programmable logic device.

In some examples, the feedback manager 112 may be configured to perform various operations (e.g., receiving, determining, transmitting) using or otherwise in cooperation with the transceiver 808.

The feedback manager 112, or its sub-components, may be physically located at various positions, including being distributed such that portions of functions are implemented at different physical locations by one or more physical components. In some examples, the feedback manager 112, or its sub-components, may be a separate and distinct component in accordance with various aspects of the present disclosure. In some examples, the feedback manager 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Aspect 1: A method for wireless communication by a user-equipment (UE), comprising: receiving a plurality of data transmissions from a plurality of other UEs; generating a feedback signal for each of the plurality of data transmissions; determining a transmission power of the feedback signal for each of the plurality of data transmissions based on at least one configuration associated with the feedback signal, wherein the feedback signals for the plurality of data transmissions are transmitted during the same feedback occasion; and transmitting the feedback signal to each of the plurality of other UEs using the determined transmission power.

Aspect 2: The method of Aspect 1, wherein the transmission powers of the feedback signals are different.

Aspect 3: The method of any of Aspects 1-2, wherein the feedback signal comprises a hybrid automatic request (HARE) feedback signal.

Aspect 4: The method of any of Aspects 1-3, wherein the determination of the transmission power comprises determining at least one energy per resource element (EPRE) parameter for the transmission of the feedback signal to each of the plurality of other UEs.

Aspect 5: The method of any of Aspects 1-4, wherein the determination of the transmission power comprises determining a ratio between the transmission power and a reference transmission power.

Aspect 6: The method of Aspect 5, wherein the reference transmission power is configured by a network node.

Aspect 7: The method of any of Aspects 5-6, wherein the reference transmission power is configured at the UE.

Aspect 8: The method of any of Aspects 5-7, further comprising determining the reference transmission power based on at least one of a bandwidth for transmission of the feedback signal for each of the plurality of data transmissions, a quantity of the feedback signals to be transmitted to the plurality of other UEs, or a transmission power capability of the UE, or any combination thereof.

Aspect 9: The method of any of Aspects 1-8, wherein the at least one configuration associated with the feedback signal comprises a distance between the UE and the plurality of other UEs.

Aspect 10: The method of Aspect 9, wherein the determination of the transmission power is based on a mapping of the distance to the transmission power such that a higher transmission power is used as the distance increases.

Aspect 11: The method of any of Aspects 9-10, further comprising: receiving at least one indication of a location of each of the plurality of other UEs, the indication being part of at least one of a sidelink control signal or the plurality of data transmissions; and determining the distance between the UE and the plurality of other UEs based on the location of each of the plurality of other UEs.

Aspect 12: The method of any of Aspects 1-11, wherein the at least one configuration associated with the feedback signal comprises a reference signal reception power (RSRP) of a reference signal transmitted by each of the plurality of other UEs.

Aspect 13: The method of Aspect 12, wherein the determination of the transmission power is based on a mapping of the RSRP to the transmission power such that a higher transmission power is used as the RSRP decreases.

Aspect 14: The method of any of Aspects 1-13, wherein the at least one configuration associated with the feedback signal comprises a priority associated with each of the plurality of data transmissions.

Aspect 15: The method of Aspect 14, wherein the determination of the transmission power is based on a mapping of the priority to the transmission power such that a higher transmission power is used as the priority increases.

Aspect 16: The method of any of Aspects 1-15, further comprising determining a transmission mode associated with each data transmission of the plurality of data transmissions, wherein the at least one configuration associated with the feedback signal comprises the transmission mode.

Aspect 17: The method of Aspect 16, wherein the transmission mode comprises unicast, groupcast, multicast, or broadcast.

Aspect 18: The method of any of Aspects 16-17, wherein the determination of the transmission power is based on a mapping of the transmission mode to the transmission power such that a higher transmission power is used if the transmission mode is unicast as compared to the transmission mode being another transmission mode.

Aspect 19: The method of any of Aspects 1-18, wherein the at least one configuration associated with the feedback signal comprises whether the feedback signal is an acknowledgement of the data transmission or a negative acknowledgement of the data transmission.

Aspect 20: The method of Aspect 19, wherein a higher transmission power is used if the feedback signal is the negative acknowledgement as compared to the feedback signal being the acknowledgement.

Aspect 21: The method of any of Aspects 1-20, wherein the at least one configuration associated with the feedback signal comprises an indication received from each of the plurality of other UEs or a network node.

Aspect 22: The method of any of Aspects 1-21, wherein the at least one configuration associated with the feedback signal comprises one or any combination of: a distance between the UE and each of the plurality of other UEs; a reference signal reception power (RSRP) parameter of a reference signal transmitted by each of the plurality of other UEs; a priority associated with each data transmission of the plurality of data transmissions; a transmission mode associated with each data transmission of the plurality of data transmissions; whether the feedback signal is an acknowledgement of the data transmission or a negative acknowledgement of the data transmission; and an indication received from each of the plurality of other UEs or a network node.

Aspect 23: The method of any of Aspects 1-22, wherein the determination of the transmission powers of the feedback signals for the plurality of data transmissions comprises: calculating another transmission power for each of the feedback signals for the plurality of data transmissions based on the at least one configuration associated with the feedback signal; determining whether a sum of the other transmission powers exceeds a maximum allowable transmission power associated with the transmission of the feedback signals during a feedback occasion; and scaling down the other transmission powers until the sum of the other transmission powers are equal to or less than the maximum allowable transmission power to determine the transmission powers of the feedback signals.

Aspect 24: The method of any of Aspects 1-23, wherein the feedback signal is transmitted via a plurality of symbols, wherein the transmission power determined based on the at least one configuration associated with the feedback signal is applied to only a portion of the plurality of symbols.

Aspect 25: An apparatus for wireless communication by a user-equipment (UE), comprising: a memory; and one or more processors coupled to the memory, wherein the one or more processors and the memory are configured to: receive a plurality of data transmissions from a plurality of other UEs; generate a feedback signal for each of the plurality of data transmissions; determine a transmission power of the feedback signal for each of the plurality of data transmissions based on at least one configuration associated with the feedback signal, wherein the feedback signals for the plurality of data transmissions are transmitted during the same feedback occasion; and transmit the feedback signal to each of the plurality of other UEs using the determined transmission power.

Aspect 26: A apparatus for wireless communication by a user-equipment (UE), comprising: means for receiving a plurality of data transmissions from a plurality of other UEs; means for generating a feedback signal for each of the plurality of data transmissions; means for determining a transmission power of the feedback signal for each of the plurality of data transmissions based on at least one configuration associated with the feedback signal, wherein the feedback signals for the plurality of data transmissions are transmitted during the same feedback occasion; and means for transmitting the feedback signal to each of the plurality of other UEs using the determined transmission power.

Aspect 27. A computer-readable medium having instructions stored thereon to cause a user-equipment (UE) to: receive a plurality of data transmissions from a plurality of other UEs; generate a feedback signal for each of the plurality of data transmissions; determine a transmission power of the feedback signal for each of the plurality of data transmissions based on at least one configuration associated with the feedback signal, wherein the feedback signals for the plurality of data transmissions are transmitted during the same feedback occasion; and transmit the feedback signal to each of the plurality of other UEs using the determined transmission power.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
   receiving a plurality of data transmissions from a plurality of other UEs;
   generating a feedback signal for each of the plurality of data transmissions;
   determining a transmission power of the feedback signal for each of the plurality of data transmissions based on at least one configuration associated with the feedback signal for each of the plurality of data transmissions, wherein the feedback signals for the plurality of data transmissions are transmitted during a same feedback occasion; and
   transmitting the feedback signals for the plurality of data transmissions to the plurality of other UEs, correspondingly, using the determined transmission power.

2. The method of claim 1, wherein the transmission powers of the feedback signals for the plurality of data transmissions are different.

3. The method of claim 1, wherein the feedback signal for each of the plurality of data transmissions comprises a hybrid automatic request (HARQ) feedback signal.

4. The method of claim 1, wherein the determination of the transmission power of the feedback signal for each of the plurality of data transmissions comprises determining at least one energy per resource element (EPRE) parameter for the transmission of the feedback signal for each of the plurality of data transmissions to each of the plurality of other UEs.

5. The method of claim 1, wherein the determination of the transmission power comprises determining a ratio between the transmission power and a reference transmission power.

6. The method of claim 5, wherein the reference transmission power is configured by a network node.

7. The method of claim 5, wherein the reference transmission power is configured at the UE.

8. The method of claim 5, further comprising determining the reference transmission power based on at least one of a bandwidth for transmission of the feedback signal for each of the plurality of data transmissions, a quantity of the feedback signals to be transmitted to the plurality of other UEs, or a transmission power capability of the UE, or any combination thereof.

9. The method of claim 1, wherein the at least one configuration associated with the feedback signal comprises a distance between the UE and the plurality of other UEs.

10. The method of claim 9, wherein the determination of the transmission power is based on a mapping of the distance to the transmission power such that a higher transmission power is used as the distance increases.

11. The method of claim 9, further comprising:
receiving at least one indication of a location of each of the plurality of other UEs, the indication being part of at least one of a sidelink control signal or the plurality of data transmissions; and
determining the distance between the UE and the plurality of other UEs based on the location of each of the plurality of other UEs.

12. The method of claim 1, wherein the at least one configuration associated with the feedback signal comprises a reference signal reception power (RSRP) of a reference signal received from each of the plurality of other UEs.

13. The method of claim 12, wherein the determination of the transmission power is based on a mapping of the RSRP to the transmission power such that a higher transmission power is used as the RSRP decreases.

14. The method of claim 1, wherein the at least one configuration associated with the feedback signal comprises a priority associated with each of the plurality of data transmissions.

15. The method of claim 14, wherein the determination of the transmission power is based on a mapping of the priority to the transmission power such that a higher transmission power is used as the priority increases.

16. The method of claim 1, further comprising determining a transmission mode associated with each data transmission of the plurality of data transmissions, wherein the at least one configuration associated with the feedback signal comprises the transmission mode.

17. The method of claim 16, wherein the transmission mode comprises unicast, groupcast, multicast, or broadcast.

18. The method of claim 16, wherein the determination of the transmission power is based on a mapping of the transmission mode to the transmission power such that a higher transmission power is used if the transmission mode is unicast as compared to the transmission mode being another transmission mode.

19. The method of claim 1, wherein the at least one configuration associated with the feedback signal comprises whether the feedback signal is an acknowledgement of the data transmission or a negative acknowledgement of the data transmission.

20. The method of claim 19, wherein a higher transmission power is used if the feedback signal is the negative acknowledgement as compared to the feedback signal being the acknowledgement.

21. The method of claim 1, wherein the at least one configuration associated with the feedback signal comprises an indication received from each of the plurality of other UEs or a network node.

22. The method of claim 1, wherein the at least one configuration associated with the feedback signal comprises one or any combination of:
a distance between the UE and each of the plurality of other UEs;
a reference signal reception power (RSRP) parameter of a reference signal received from each of the plurality of other UEs;
a priority associated with each data transmission of the plurality of data transmissions;
a transmission mode associated with each data transmission of the plurality of data transmissions;
whether the feedback signal is an acknowledgement of the data transmission or a negative acknowledgement of the data transmission; and
an indication received from each of the plurality of other UEs or a network node.

23. The method of claim 1, wherein the determination of the transmission powers of the feedback signals for the plurality of data transmissions comprises:
calculating another transmission power for each of the feedback signals for the plurality of data transmissions based on the at least one configuration associated with the feedback signal;
determining whether a sum of the other transmission powers exceeds a maximum allowable transmission power associated with the transmission of the feedback signals during a feedback occasion; and
scaling down the other transmission powers until the sum of the other transmission powers are equal to or less than a maximum allowable transmission power to determine the transmission powers of the feedback signals.

24. The method of claim 1, wherein the feedback signal is transmitted via a plurality of symbols, wherein the transmission power determined based on the at least one configuration associated with the feedback signal is applied to only a portion of the plurality of symbols.

25. An apparatus for wireless communication by a user-equipment (UE), comprising:
a memory; and
one or more processors coupled to the memory, wherein the one or more processors and the memory are configured to:
receive a plurality of data transmissions from a plurality of other UEs;
generate a feedback signal for each of the plurality of data transmissions;
determine a transmission power of the feedback signal for each of the plurality of data transmissions based on at least one configuration associated with the feedback signal for each of the plurality of data transmissions, wherein the feedback signals for the plurality of data transmissions are transmitted during a same feedback occasion; and
transmit the feedback signals for the plurality of data transmissions to the plurality of other UEs, correspondingly, using the determined transmission power.

26. A apparatus for wireless communication by a user-equipment (UE), comprising:
means for receiving a plurality of data transmissions from a plurality of other UEs;
means for generating a feedback signal for each of the plurality of data transmissions;
means for determining a transmission power of the feedback signal for each of the plurality of data transmissions based on at least one configuration associated with the feedback signal for each of the plurality of data transmissions, wherein the feedback signals for the plurality of data transmissions are transmitted during a same feedback occasion; and
means for transmitting the feedback signals for the plurality of data transmissions to the plurality of other UEs, correspondingly, using the determined transmission power.

27. A non-transitory computer-readable medium having instructions stored thereon to cause a user-equipment (UE) to:
receive a plurality of data transmissions from a plurality of other UEs;
generate a feedback signal for each of the plurality of data transmissions;

determine a transmission power of the feedback signal for each of the plurality of data transmissions based on at least one configuration associated with the feedback signal for each of the plurality of data transmissions, wherein the feedback signals for the plurality of data transmissions are transmitted during a same feedback occasion; and transmit the feedback signals for the plurality of data transmissions to the plurality of other UEs, correspondingly, using the determined transmission power.

28. The method of claim 1, wherein the feedback signals for the plurality of data transmissions are frequency division multiplexed in the same feedback occasion.

* * * * *